(12) United States Patent
Stährfeldt et al.

(10) Patent No.: US 6,194,493 B1
(45) Date of Patent: Feb. 27, 2001

(54) 4-HYDROXYQUINOLINE-3-CARBOXYLIC ACID DERIVATIVES AS LIGHT STABILIZERS

(75) Inventors: Thomas Stährfeldt, Neusäss; Mathias Mehrer, Gablingen, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/146,618

(22) Filed: Sep. 3, 1998

(30) Foreign Application Priority Data

Sep. 4, 1997 (DE) ............................................. 197 38 616

(51) Int. Cl.[7] ................ C08K 5/34; C08K 5/48; C09K 21/10; C07D 215/56
(52) U.S. Cl. ............... 524/87; 524/89; 524/108; 546/156; 252/384; 252/405; 252/609
(58) Field of Search ................. 524/87, 89; 546/156; 252/609, 405, 384

(56) References Cited

U.S. PATENT DOCUMENTS

| 3,617,179 | * | 11/1971 | Lewis | 260/155 |
| 4,264,604 | * | 4/1981 | Sturm | 424/258 |
| 4,450,167 | * | 5/1984 | Le Martret | 424/258 |
| 5,753,729 | | 5/1998 | Valet et al. | 524/100 |

FOREIGN PATENT DOCUMENTS

| 1769336 | 8/1971 | (DE) . |
| 4416809 | 11/1994 | (DE) . |
| 19820157 | 11/1998 | (DE) . |
| 04003076 | 1/1992 | (JP) . |

OTHER PUBLICATIONS

European Search Report.
Derwent Patent Family Report and/or Abstracts.
R. Gächter, H. Müller, Pllastic Additives Handbook, 3$^{rd}$Ed., 1990, p. 133 ff., p. 181 ff.
Coccidiostatisch Wirksame 4–Hydroxy–7–aminomenthyl–6–äthylchinolin–3–carbonsäureäthylester, E. Schrötter, A. Raddatz, D Hübler and K.Chemnitius, Pharmazie, 1977, 32(4), pp. 223–225.
Organic Synthesis, Collective vol. 3, A Revised Edition of Annual vol. 20–29, John Wiley & Sons, Inc., New York, pp. 274–277, 1995.
Houben–Weyl, Hetarene II, Part I, vol. E7A, pp. 343 ff, 1991.

* cited by examiner

*Primary Examiner*—Evelyn Mei Huang
(74) *Attorney, Agent, or Firm*—Susan S. Jackson; Scott E. Hanf

(57) ABSTRACT

The present invention relates to the use of compounds of the formula (I)

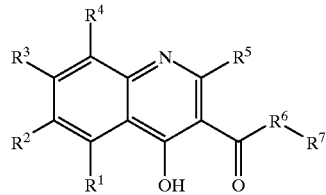

where the substituents are as defined in the description as a stabilizer for organic material against the harmful effect of light, oxygen and heat.

9 Claims, No Drawings

4-HYDROXYQUINOLINE-3-CARBOXYLIC ACID DERIVATIVES AS LIGHT STABILIZERS

BACKGROUND OF THE INVENTION

It is known that organic materials are damaged by light, radiation, heat or oxygen. There are already numerous documents which describe compounds for stabilizing organic material against said effects. Such compounds are usually free-radical scavengers, hydroperoxide decomposers, quenchers (extinguishers for excited states) or UV absorbers (cf. R. Gächter, H. Müller, Plastics Additives Handbook, 3rd Ed., Hanser Verlag, Munich 1990, p. 133 ff). In connection with UV absorbers, the compounds involved are generally based on 2-hydroxybenzophenone, 2-hydroxyphenylbenzotriazole, cinnamic esters and oxanilides (cf. R. Gächter, H. Müller, Plastics Additives Handbook, 3rd Ed., Hanser Verlag, Munich 1990, p. 181 ff). The class of the o-hydroxy-substituted triphenylpyrimidines can also be regarded as a separate type of UV stabilizer (DE-A4 416 809).

Said classes of compound often have specific disadvantages which occur alongside the desired stabilizing effect. In respect in particular of color characteristics, interaction with pigments, compatibility of different stabilizers with one another and with the material to be stabilized, resistance to chemicals and water (sensitivity to hydrolysis), storage stability, migration behavior and improvement in stabilization to the harmful effects of heat and light, especially in long-term use, there is a great need for new classes of stabilizer.

Derivatives of 4-hydroxyquinoline-3-carboxylic acid of the formula (I) have been known for some time in connection with pharmaceutical applications (cf. e.g. E. Schroetter et al., Pharmazie (1977), 32(4), 223–5).

The applications relate to the action of compounds of the formula (I) against bacteria, parasites, tumors, suppurating ulcers, gastrointestinal dysfunctions and as enzyme inhibitors. Nothing is known of any stabilizing action of compounds of the formula (I) on organic material, especially their potential as UV absorbers.

Processes for preparing compounds of the formula (I) are known, for example, from Organic Syntheses Coll. Vol. III, p. 274; Houben-Weyl, Heterarene II, Part 1, Volume E7a, p. 343 ff.

SUMMARY OF THE INVENTION

It has now been found surprisingly that compounds of the formula (I) provide outstanding stabilization of organic material against the harmful effects of light, heat and oxygen. The substances (I) possess absorption bands in the UV region with extinction coefficients of up to more than 20,000.

This represents a new class of stabilizer, which effectively protects organic and inorganic material against the harmful effects of heat and light. The compounds of this new class of stabilizer can be applied to the external layer of the material to be stabilized, or mixed in with the material.

DESCRIPTION OF THE PREFERRED EMBODIMENTS

The invention therefore provides for the use of compounds of the formula (I) as a stabilizer for organic material against the harmful effect of light, oxygen and heat,

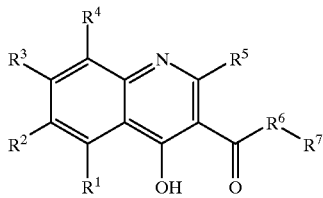

(I)

where
$R^1$ to $R^5$ independently of one another are halogen, H, $NO_2$, $CF_3$, CN; $C_1-C_{20}^-$, preferably $C_1-C_{10}^-$, especially $C_1-C_4$-alkyl, —S-alkyl or —O-alkyl; $C_6-C_{14}^-$, preferably $C_{6-C10}$-aryl, —S-aryl or O-aryl; $C_5-C_{13}^-$, preferably $C_{5-C10}$-heteroaryl; $C_{7-C26}^-$, preferably $C_{7-C13}$-alkylaryl, —S-alkylaryl or —O-alkylaryl.

Two of the radicals $R^1$ to $R^4$ can together with the parent structure form a 5–12-membered, preferably a 5–6-membered aliphatic ring which is unsubstituted or substituted by halogen, $NO_2$, CN, $CF_3$, $C_1-C_{20}^-$, preferably $C_1-C_{10}^-$, especially $C_1-C_4$-alkyl, —O-alkyl or —S-alkyl, $C_6-C_{14}^-$, preferably $C_6-C_{10}$-aryl, —O-aryl or —S-aryl, $C_5-C_{13}^-$, preferably $C_5-C_{10}$-heteroaryl, $C_7-C_{26}^-$, preferably $C_7-C_{13}$-alkylaryl, —O-alkylaryl or —S-alkylaryl and which can include one or more heteroatoms; this aliphatic ring can, in particular, be interrupted by —S—, —O—, —N(H)—.

Of the radicals $R^1$ to $R^4$, two adjacent radicals in each case can together with the parent structure form a further 5–6-membered, preferably 6-membered aromatic ring which is unsubstituted or substituted by halogen, $NO_2$, $CF_3$, CN, $C_1-C_{20}^-$, preferably $C_1-C_{10}^-$, especially $C_1-C_4$-alkyl, —O-alkyl or —S-alkyl, $C_6-C_{14}^-$, preferably $C_6-C_{10}$-aryl, —O-aryl or —S-aryl, $C_5-C_{13}^-$, preferably $C_5-C_{10}$-heteroaryl, $C_7-C_{26}^-$, preferably $C_7-C_{13}$-alkylaryl, —O-alkylaryl or —S-alkylaryl and which can include one or more heteroatoms or can be fused to a further aromatic nucleus.

$R^6$ is —O— or —$N(R^8)$—,
where $R^8$ is hydrogen or $C_1-C_{12}^-$, preferably $C_1-C_4^-$alkyl, but especially hydrogen.

$R^7$ is H, $C_1-C_{30}$-alkyl, preferably $C_1-C_{16}$-alkyl, especially $C_1-C_5$-alkyl, $C_3-C_{12}$-cycloalkyl, preferably $C_5-C_6$-cycloalkyl; $C_6-C_{14}$-aryl which is unsubstituted or substituted by halogen, $NO_2$, CN, $CF_3$, $CF_3$, O—$C_1-C_{20}^-$, preferably O—$C_1-C_{10}^-$, especially O—$C_1-C_4$-alkyl, O—$C_6$—$C_{14}^-$, preferably O—$C_6-C_{10}$-aryl, or O—$C_7-C_{26}^-$, preferably O—$C_7-C_{13}$-arylalkyl; $C_7-C_{30}$-arylalkyl which is unsubstituted or substituted by halogen, $NO_2$, $CF_3$, O—$C_1-C_{20}^{20}$, preferably O—$C_1-C_{10}^-$, especially O—$C_1-C_4$-alkyl, O—$C_6-C_{14}^-$, preferably O—$C_6$—$C_{10}$-aryl or O—$C_{7-C26}^-$, preferably O—$C_7-C_{13}$-arylalkyl; or is a heteroaromatic radical having 5–15 carbon atoms.

When used in organic material they can be added in solid form, in the form of a melt, in a form dissolved in solvents or else as a masterbatch to the material that is to be stabilized, before, during or after polymerization. When added in solid form, the compounds of the formula (I) are particularly suitable in finely divided form. A masterbatch is particularly appropriate when it comprises the novel stabilizer in a concentration of from 1 to 80%, but preferably of 5–30% by weight, the remainder of the masterbatch being a polymer compatible with the polymer to be stabilized. Incorporation in dissolved form is particularly appropriate, in which case the solutions can comprise the novel stabilizer, for example, in a concentration of 5–80% by weight. Both the solution and the masterbatch may additionally contain further stabilizers or effect substances, examples being further UV absorbers, light stabilizers based on sterically hindered amines, quenchers, antioxidants, pigments, acid scavengers or fillers. The novel stabilizers are preferably employed such that their concentration in the polymer to be stabilized is from 0.001 to 5% by weight, preferably from 0.02 to 2% by weight, based on the organic material, and they are present either alone or in combination with further additives.

By organic material is meant, for example, precursors of plastics, paints, varnishes and oils, but especially plastics, paints, varnishes and oils themselves.

The stabilizers of the formula (I) are particularly suitable for stabilizing films, fibers, tapes, multifilaments, wovens, extruded, blow molded, injection molded and thermoformed articles, powder coating materials, printing inks, toner inks, photographic material, pigments, wood stains, leathers, architectural paints, protective coatings for steel structures, lubricating oils, machine oils, bitumen and asphalt. They are also suitable for cosmetic or pharmaceutical applications, in which the UV-absorbing nature of the compounds of the formula (I) is of advantage. Compounds of the formula (I) are also suitable for use in UV filters, especially when these compounds are dissolved or embedded in polymeric material.

The stabilizers of the formula (I) according to the invention can also be employed advantageously in combinations with further stabilizers. The result of these novel combinations are mixtures having an improved profile of properties with respect to the individual components, such as synergies in the photoprotective effect, for example.

The present invention additionally provides an organic material stabilized against the action of light, oxygen and heat, said material especially comprising plastics, paints, varnishes and oils and comprising compounds of the formula (I) in the concentrations stated above.

Examples of such materials are:

1. Polymers of monoolefins and diolefins, for example polypropylene, polyisobutylene, polybut-1-ene, poly4-methylpent-1-ene, polyisoprene or polybutadiene, as well as polymers of cycloolefins, for example of cyclopentene or norbornene; furthermore polyethylene (which optionally can be crosslinked); for example, high density polyethylene (HDPE), polyethylene of high density and high molar mass (HDPE-HMW), polyethylene of high density and ultrahigh molar mass (HDPE-UHMW), medium density polyethylene (HMDPE), low density polyethylene (LDPE), linear low density polyethylene (LLDPE), branched low density polyethylene (BLDPE).

Polyolefins, i.e. polymers of monoolefins exemplified in the preceding paragraph, in particular polyethylene and polypropylene, can be prepared by various, and especially by the following, methods:

a) free-radical polymerization (normally under high pressure and at elevated temperature)

b) catalytic polymerization using a catalyst that normally contains one or more metals of group IVb, Vb, VIb or VIII of the Periodic Table. These metals usually have one or more ligands, such as oxides, halides, alcoholates, esters, ethers, amines, alkyls, alkenyls and/or aryls that may be either π- or σ-coordinated. These metal complexes may be in the free form or fixed on substrates, for example on activated magnesium chloride, titanium(III) chloride, alumina or silicon oxide. These catalysts may be soluble or insoluble in the polymerization medium. The catalysts can be active as such in the polymerization or further activators may be used, for example metal alkyls, metal hydrides, metal alkyl halides, metal alkyl oxides or metal alkyloxanes, the metals being elements of groups Ia, IIa and/or IIIa of the Periodic Table. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polyethylene with polyisobutylene, polypropylene with polyethylene (for example PP/HDPE/LDPE) and mixtures of different types of polyethylene (for example LDPE/HDPE) with one another.

3. Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide or ethylene-acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned under 1), for example polypropylene-ethylene-propylene copolymers, LDPE-ethylene-vinyl acetate copolymers, LDPE-ethylene-acrylic acid copolymers, LLDPE-ethylene-vinyl acetate copolymers, LLDPE-ethylene-acrylic acid copolymers and alternating or random polyalkylene-carbon monoxide copolymers and mixtures thereof with other polymers, for example polyamides.

4. Hydrocarbon resins (for example $C_{5-C9}$) including hydrogenated modifications thereof (e.g. tackifier resins) and mixtures of polyalkylenes and starch.

5. Polystyrene, poly(p-methylstyrene), poly(a-methylstyrene).

6. Copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrenemaleic anhydride, styrene-acrylonitrile-methacrylate; mixtures of high impact strength of styrene copolymers and another polymer, for example a polyacrylate, a diene polymer or an ethylene-propylene-diene terpolymer; and block copolymers of styrene, such as styrene-butadiene-styrene, styrene-isoprene-styrene, styrene-ethylene/butylene-styrene or styrene-ethylene/propylenestyrene.

7. Graft copolymers of styrene or a-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers, such as polychloroprene, chlorinated rubber, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from α,β-unsaturated acids and derivatives thereof, such as polyacrylates and polymethacrylates, polyacrylonitriles, polyacrylamides and polymethyl methacrylates impact-modified with butyl acrylate.

10. Copolymers of the monomers mentioned under 9) with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in section 1.

12. Homopolymers and copolymers of cyclic ethers, such as polyalkylene glycols, polyethylene oxide, polypropylene oxide or copolymers thereof with bisglycidyl ethers.

13. Polyacetals such as polyoxymethylene and those polyoxymethylenes which contain comonomers, for example ethylene oxide; polyacetals modified with thermoplastic polyurethanes, acrylates or MBS.

14. Polyphenylene oxides and sulfides, and mixtures thereof with styrene polymers or polyamides.

15. Polyurethanes derived from hydroxyl-terminated polyethers, polyesters and polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. As well as polyamides or copolyamides modified with EPDM or ABS; and polyamides condensed during processing (RIM polyamide systems).

17. Polyureas, polyimides, polyamide-imides, polyether imides, polyester amides, polyhydantoins and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example from epoxy acrylates, urethane acrylates or polyester acrylates.

25. Alkyd resins, polyester resins and acrylic resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, examples being products of bisphenol A diglycidyl ethers, bisphenol F diglycidyl ethers, which are crosslinked by means of customary hardeners, such as anhydrides or amines, for example, with or without accelerators.

27. Natural polymers such as cellulose, natural rubber, gelatin and derivatives thereof which have been chemically modified in a polymer-homologous manner, for example cellulose acetates, cellulose propionates and cellulose butyrates, or the cellulose ethers such as methyl cellulose; as well as rosins and derivatives.

28. Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/MBS, PPO/HIPS, PPO/PA 6.6 and copolymers, PA/HDPE, PA/PP, PA/PPO, PBT/ABS or PBT/PET/PC.

29. Natural and synthetic organic substances which constitute pure monomeric compounds or mixtures thereof, examples being mineral oils, animal or vegetable fats, oils and waxes, or oils, waxes and fats based on synthetic esters (e.g. phthalates, adipates, phosphates or trimellitates), and also blends of synthetic esters with mineral oils in any desired proportion by weight, as are employed, for example, as spin finishes, and aqueous emulsions thereof.

30. Aqueous emulsions of natural or synthetic rubbers, such as natural rubber latex or latices of carboxylated styrene-butadiene copolymers.

The organic material stabilized with the compounds of the formula (I) or by an appropriate combination comprising these compounds may, if desired, include further additives as well, examples being antioxidants, light stabilizers, metal deactivators, antistatic agents, flame retardants, lubricants, nucleating agents, acid scavengers (basic costabilizers), hydrotalcites, pigments and fillers. Suitable additives added in addition to the compounds (I) are, for example, compounds based on sterically hindered amines or on sterically hindered phenols, or sulfur- or phosphorus-containing costabilizers.

The additives for the formula (I) or combinations of (I) with further additives are incorporated into the organic material, preferably into the polymer, by the customary methods. Incorporation can take place, for example, by mixing or applying the compounds with or without further additives, into or onto the polymer directly prior to, during or after the polymerization, or into the polymer melt prior to or during the shaping operation. Incorporation can also take place by applying the dissolved or dispersed compounds onto the polymer directly or by mixing them into a solution, suspension or emulsion of the polymer, with or without subsequent evaporation of the solvent. When added in solid form, the compounds of the formula (I) are particularly suitable in finely divided form. The compounds are also effective when incorporated subsequently, in a separate processing step, into an already granulated polymer.

EXPERIMENTAL SECTION

General preliminary remarks on preparing the novel light stabilizers

The compounds 1 to 9 employed in accordance with the invention were prepared by prior art techniques, in particular by the methods described, inter alia, in Organic Syntheses Coll. Vol. III, p. 274 and in Houben-Weyl, Heterarene II, Part 1, Volume E7a, p. 343 ff., i.e. by thermal cyclization of appropriately substituted (arylamino-methylene)malonic acid dialkyl esters in a high-boiling solvent. The cyclizable (arylamino-methylene)malonic acid dialkyl esters were prepared by condensation of primary amines with ethoxymethylene-malonic acid dialkyl esters, as described in Houben-Weyl, Heterarene II, Part 1, Volume E7a, p. 345. The cyclizable S-alkyl-substituted (arylamino-methylene) malonic acid dialkyl esters for the synthesis of 4-hydroxyquinoline-3-carboxylic acid ester with the —S-alkyl substituent, especially the —S—$CH_3$ substituent, in position 2 can be prepared in analogy to the method published in Houben-Weyl, Heterarene II, Part 1, Volume E7a, p. 376, in particular by reaction of aryl thioisocyanate with the sodium salt of malonic acid and subsequent reaction with alkyl iodide. The precursors of the derivatives having the —CN substituent in position 2 were prepared by the method described by S. E. J. Glue, I. T. Kay in Synthesis (1977), 607–8.

EXAMPLES 1–7

0.2 mol of diethyl ethoxymethylenemalonate (Hüls AG, Marl, Germany) are stirred at reflux with 0.2 mol of an appropriately ring-substituted aniline derivative in 200 ml of xylene for about 20 h, with TLC monitoring (TLC=thin layer chromatography). The ethanol eliminated in the course of this procedure is distilled off continuously together with a small amount of xylene. The internal temperature rises first to about 6° C., after a reflux for 10 h to about 100° C., and subsequently to up to 112° C. Following the end of the reaction (TLC monitoring) the volatile constituents are removed at 90° C. and 10 mbar. The (arylamino-methylene) malonic acid diethyl ester is obtained in sufficient purity ($^1$H-NMR), with yields of 90–95%. 0.2 mol of the resulting arylaminoethylene are introduced into 190 ml of boiling diphenyl ether (247° C.); the ethanol produced immediately is distilled off continuously. After 50 minutes the resulting suspension is cooled to 40° C., and 250 ml of hexane are added. The precipitate is subsequently stirred at 20° C. for 12 h, filtered off with suction, washed with 50 ml of hexane and freed from adhering hexane at 50° C. in a vacuum drying cabinet. The yield and melting point of the respective products are summarized in Table 1.

EXAMPLE 8

80.0 g (0.5 mol) of diethyl malonate are dissolved in 400 ml of DMF, and 15.2 g (0.505 mol) of NaH (80% in paraffin) in portions are added with stirring and under nitrogen at about 20° C. To complete the reaction the mixture is stirred at 50° C. for 1 h. After it has cooled to room temperature, 78.1 g (0.55 mol) of methyl iodide (dissolved in 50 ml of DMF) are added dropwise at a rate such that the internal temperature does not exceed 40° C., and a pale yellow precipitate is produced. The suspension is stirred at 20° C. for 20 h and then poured into a mixture of 300 ml of water and 300 ml of methylene chloride. The organic phase is separated off, dried with 20 g of sodium sulfate, which is then separated off, and mixed thoroughly at 20° C. with 5 g of granulated activated carbon. Following filtration, the volatile constituents are removed at 90° C. and 10 mbar. Yield: 147.5 g (96%), yellow oil.

The yellow oil thus obtained is introduced under nitrogen into boiling o-dichlorobenzene (about 166° C.). The ethanol which forms immediately is distilled off continuously. Following the end of the addition, the solution is stirred at 166° C. for 2 h and then cooled to 20° C. The volatile constituents are removed at 120° C. and 10 mbar to leave a yellow crystalline crude product (121.5 g) which is recrystallized from heptane. Following recrystallization, 91.1 g (72.2%) of a yellow crystalline solid are isolated (m.p.: 82–83° C.).

EXAMPLE 9

27.6 g (0.2 mol) of phenyl isothiocyanate (c=98%) are introduced under nitrogen into 400 ml of absolute methanol. At 20° C. and with stirring, 13.4 g (0.2 mol) of KCN are added, and a pale yellow suspension is formed. The reaction mixture is heated to 45° C., in the course of which the solid constituents go into solution. 35.4 g (0.2 mol) of dimethyl chloromalonate (c=94%) are added rapidly at 45° C. The orange-colored solution is stirred at 20° C. for 3 h, and a pale precipitate is formed. The suspension is filtered; the precipitate is discarded and the solution is freed from the volatile constituents at 90° C and 10 mbar. The crude product which remains is taken up in 200 ml of methyl tert-butyl ether and subjected twice to extraction by shaking with 200 ml of water each time. The organic phase is dried over sodium sulfate and freed again under reduced pressure from the volatile constituents. The product is isolated as an orange-colored oil (51.9 g, 99.8%).

The orange-colored oil thus obtained is dissolved in o-dichlorobenzene and brought to reflux (168° C.) with stirring. The methanol which forms is distilled off continuously. After stirring at 163° C. for 4 h (TLC monitoring) the solution is cooled. The volatile constituents are removed at 120° C. and 10 mbar. The brown residue is subjected to extraction by stirring with 50 ml of diisopropyl ether, and the suspension is again freed from the volatile constituents in vacuo. The crude product is recrystallized from 50 ml of ethanol. Yield: 10.4 g (22.8%), ocher crystals, m.p. 181–183° C.

TABLE 1

Substitution and melting points of the compounds of Example 1–9:

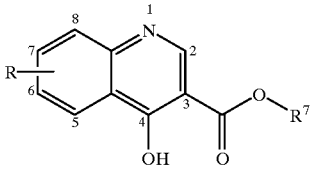

| Example | R' | R | Yield | m.p. |
|---|---|---|---|---|
| 1 | $CH_2CH_3$ | 6-$CF_3$ | 50.4% | 332° C. (d) |
| 2 | $CH_2CH_3$ | 8-$CF_3$ | 77.3% | 212° C. |
| 3 | $CH_2CH_3$ | 6-F | 82.7% | 307° C. (d) |
| 4 | $CH_2CH_3$ | 6-$NO_2$ | 57.3% | 322° C. |
| 5 | $CH_2CH_3$ | 8-S-$CH_3$ | 62.5% | 203° C. |
| 6 | $CH_2CH_3$ | 6-$OCH_2\Phi$ | 69.0% | 289° C. |
| 7 | $CH_2CH_3$ | 8-$CH_3$ | 68.9% | 276° C. |
| 8 | $CH_2CH_3$ | 2-S-$CH_3$ | 79.5% | 85° C. |
| 9 | $CH_3$ | 2-CN | 22.8% | 183° C. |

TABLE 2

Characterization of four selected examples in the UV spectrum

| Compound from Example | Absorption maximum | Extinction coefficient |
|---|---|---|
| 2 | 300 nm (s) | 9302 |
|   | 321 nm (vs) | 10056 |
|   | 332 nm (vs) | 10316 |
| 5 | 325 nm (vs) | 14130 |
|   | 336 nm (s, sh) | — |
| 7 | 313 nm (vs) | 15978 |
|   | 324 nm (s, sh) | — |
| 8 | 268 nm (vs) | 20259 |
|   | 325 nm (s) | 8734 |

TABLE 3

Volatility of three selected examples

| Compound | 1 | 4 | 6 |
|---|---|---|---|
| Volatility* | 49% | 4.3% | 24.5% |

*The volatility is measured under nitrogen; initial weight: 500 mg; boat: Pt; surface: 3 cm²; heating: 120° C./h (heating to 300° C., then continued heating at 300° C. for 10 minutes).

EXAMPLES 10–14

Light Stabilizing Action in Polypropylene Films 100 parts by weight of unstabilized polypropylene (®Hostalen PPK, Clariant GmbH) were mixed together with 0.1 part by weight of calcium stearate (from Greven), 0.05 part by weight of pentaerythrityl tetrakis[3-(3,5-di-tert-butyl4-hydroxyphenyl)propionate (®Hostanox O 10, Clariant GmbH) and 0.1 part by weight of the test stabilizer, and the mixture was granulated once. The granules are processed by injection molding to give 1.0 mm thick plates which were exposed in an accelerated weathering device (®Xenotest 1200). The criterion employed for the stability of the injection molded plate was the change in the surface embrittlement. The degree of surface embrittlement was evaluated using scores between 0 and 6, where 0 corresponds to no visible change and 6 corresponds to very severe surface embrittlement. For comparative purposes an injection molded plate was tested under the same conditions but without the addition of a stabilizer according to the invention. The results of the experiment are summarized in Table 4.

TABLE 4

Change in surface embrittlement of injection molded PP plates stabilized in accordance with the invention

| Example No. | Stabilizer | Surface embrittlement after 460 h |
|---|---|---|
| 10 | no stabilizer | 2 |
| 11 | stabilizer 2 | 0 |
| 12 | stabilizer 5 | 1 |
| 13 | stabilizer 7 | 0 |
| 14 | stabilizer 8 | 0 |

What is claimed is:

1. A method of stabilizing an organic material against the degradation caused by light, radiation, heat and oxygen, comprising adding a stabilizing amount of a compound of the formula (I)

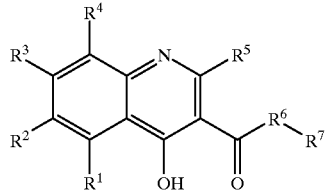

where
$R^1$ to $R^5$ independently of on another are halogen, H, $NO_2$, $CH_3$, CN; $C_1$–$C_{20}$-alkyl, —S-alkyl or —O-alkyl; $C_6$–$C_{14}$-aryl, —S-aryl or —O-aryl; $C_5$–$C_{13}$-heteroaryl; $C_7$–$C_{26}$-alkylaryl, —S-alkylaryl or —O-alkylaryl,
$R^6$ is —O— or —N($R^8$)—, where $R^8$ is hydrogen or $C_1$–$C_{12}$-alkyl,
$R^7$ is H, $C_1$–$C_{30}$-alkyl, $C_3$–$C_{12}$-cycloalkyl; $C_6$–$C_{14}$-aryl which is unsubstituted or substituted by halogen, $NO_2$, $CF_3$, O—$C_1$–$C_{20}$-alkyl, O—$C_6$–$C_{14}$-aryl or O—$C_7$–$C_{26}$-arylalkyl; $C_7$–$C_{30}$-arylalkyl which is unsubstituted or substituted by halogen, $NO_2$, $CF_3$, O—$C_1$–$C_{20}$-alkyl, O—$C_6$–$C_{14}$-aryl or O—$C_7C_{26}$-arylalkyl; or is a heteroaromatic radical having 5–15 carbon atoms, to the material to be stabilized.

2. The method of claim 1, wherein
$R^1$ to $R^5$ independently of on another are halogen H, $NO_2$, $CF_3$, CN; $C_1$–$C_4$-alkyl, —S-alkyl or —O-alkyl; $C_6$–$C_{10}$-aryl, —S-aryl or —O-aryl; $C_5$–$C_{13}$-heteroaryl; $C_7$–$C_{13}$-alkylaryl, —S-alkylaryl or —O-alkylaryl,
$R^6$ is —O— or —N($R^8$)—, where $R^8$ is hydrogen or $C_1$–$C_4$-alkyl,
$R^7$ is H, $C_1$–$C_5$-alkyl, $C_5$–$C_6$-cycloalkyl; $C_6$–$C_{10}$-aryl which is unsubstituted or substituted by halogen, $NO_2$, $CF_3$, O—$C_1$–$C_4$-alkyl, O—$C_6C_{10}$-aryl or O—$C_7$–$C_{13}$-arylalkyl; $C_7$–$C_{30}$-arylalkyl which is unsubstituted or substituted by halogen, $NO_2$, $CF_3$, O—$C_1$–$C_4$-alkyl, O—$C_6$–$C_{10}$-aryl or O—$C_7$–$C_{13}$-arylalkyl; or is a heteroaromatic radical having 5–15 carbon atoms.

3. The method of claim 1, wherein
$R^1$ to $R^5$ independently of one another are halogen, H, $NO_2$, $CF_3$CN; $C_1$–$C_4$-alkyl, —S-alkyl or —O-alkyl; $C_6$–$C_{10}$-aryl, —S-aryl or —O-aryl; $C_7$–$C_{13}$-alkylaryl, —S-alkylaryl or —O-alkylaryl, $R^6$ is —O— or —N($R^8$)—, where $R^8$ is hydrogen, $R^7$ is H, $C_1$–$C_5$-alkyl, $C_6$–$C_{10}$-aryl, $C_7$–$C_{30}$-arylalkyl, or is a heteroaromatic radical having 5–5 carbon atoms.

4. The method of claim 1, wherein the organic material comprises at least one member selected from the group consisting of plastics, paints, oils and varnishes.

5. The method of claim 1, wherein the organic material is in a pharmaceutical or cosmetic product.

6. A stabilized organic material comprising:
a) at least one member selected from the group consisting of a plastic, a paint, and a varnish, and
b) at least one compound of the formula (I)

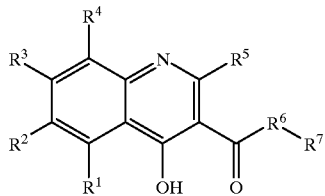
(I)

where $R^1$ to $R^5$ independently of on another are halogen, H, $NO_2$, $CF_3$, CN; $C_1$–$C_{20}$-alkyl, —S-alkyl or —O-alkyl; $C_6$–$C_{14}$-aryl, —S-aryl or —O-aryl; $C_5$–$C_{13}$-heteroaryl; $C_7$–$C_{26}$-alkylaryl, —S-alkylaryl or —O-alkylaryl, $R^6$ is —O— or —N($R^8$)—, where $R^8$ is hydrogen or $C_1$–$C_{12}$-alkyl, $R^7$ is H, $C_1$–$C_{30}$-alkyl, $C_3$–$C_{12}$-cycloalkyl; $C_6$–$C_{14}$-aryl which is unsubstituted or unsubstituted by halogen, $NO_2$, $CF_3$, O—$C_1$–$C_{20}$-alkyl, O—$C_6$–$C_{14}$-aryl or O—$C_7$–$C_{26}$-arylalkyl; $C_7$–$C_{30}$-arylalkyl which is unsubstituted or substituted by halogen, $NO_2$, $CF_3$, O—$C_1$–$C_{20}$-alkyl, O—$C_6C_{14}$-aryl or O-$C_7$–$C_{26}$-arylalkyl; or is a heteroaromatic radical having 5–5 atoms.

7. The stabilized organic material as claimed in claim 1, which comprises, as further additives, antioxidants, light stabilizers, metal deactivators, antistats, flame retardants, pigments, acid scavengers or fillers.

8. A method of stabilizing organic material against the degradation caused by light, radiation, heat and oxygen, comprising adding a compound of the formula (I)

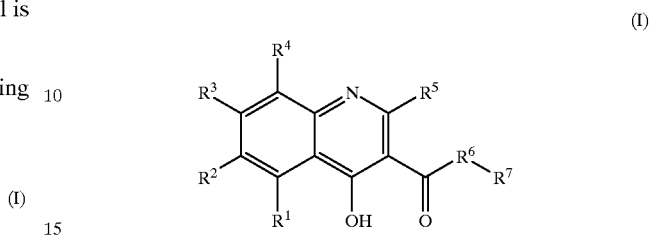
(I)

where $R^1$ to $R^5$ independently of on another are halogen, H, $NO_2$, $CF_3$, CN; $C_1$–$C_{20}$-alkyl, —S-alkyl or —O-alkyl; $C_6$–$C_{14}$-aryl, —S-aryl or —O-aryl; $C_5$–$C_{13}$-heteroaryl; $C_7$–$C_{26}$-alkylaryl, —S-alkylaryl or —O-alkylaryl, $R^6$ is —O— or —N($R^8$)—, where $R^8$ is hydrogen or $C_1$–$C_{12}$-alkyl, $R^7$ is H, $C_1$–$C_{30}$-alkyl, $C_3$–$C_{12}$-cycloalkyl; $C_6$–$C_{14}$-aryl which is unsubstituted or substituted by halogen, $NO_2$, $CF_3$, O—$C_1$–$C_{20}$-alkyl, O—$C_6$–$C_{14}$-aryl or O—$C_7$–$C_{26}$-arylalkyl; $C_7$–$C_{30}$-arylalkyl which is unsubstituted or substituted by halogen, $NO_2$, $CF_3$, O—$C_1$–$C_{20}$-alkyl, O—$C_6$–$C_{14}$-aryl or O—$C_7$–$C_{26}$-arylalkyl; or is a heteroaromatic radical having 5–15 carbon atoms;

in a concentration of 0.001–5% by weight, to the material to be stabilized.

9. The method as claimed in claim 8, wherein said compound of the formula (I) is added in a concentration of 0.1–2.0% by weight.

* * * * *